(12) United States Patent
Strandberg et al.

(10) Patent No.: US 12,049,390 B2
(45) Date of Patent: Jul. 30, 2024

(54) CRANE COMPRISING A MOVABLE BOOM AND A MOVABLE COUNTERWEIGHT

(71) Applicant: S&L ACCESS SYSTEMS AB, Gothenburg (SE)

(72) Inventors: Michael Strandberg, Västerås (SE); Kenneth Lundberg, Västerås (SE)

(73) Assignee: Skyrex AB, Gothenburg (SE)

( * ) Notice: Subject to any disclaimer, the term of this patent is extended or adjusted under 35 U.S.C. 154(b) by 231 days.

(21) Appl. No.: 17/788,353

(22) PCT Filed: Nov. 19, 2020

(86) PCT No.: PCT/EP2020/082712
§ 371 (c)(1),
(2) Date: Jun. 23, 2022

(87) PCT Pub. No.: WO2021/129988
PCT Pub. Date: Jul. 1, 2021

(65) Prior Publication Data
US 2023/0026998 A1 Jan. 26, 2023

(30) Foreign Application Priority Data
Dec. 27, 2019 (EP) .................. 19219846

(51) Int. Cl.
*B66C 23/72* (2006.01)
*B66C 23/26* (2006.01)
*B66C 23/18* (2006.01)

(52) U.S. Cl.
CPC .............. *B66C 23/72* (2013.01); *B66C 23/26* (2013.01); *B66C 23/185* (2013.01)

(58) Field of Classification Search
CPC ........ B66C 23/26; B66C 23/185; B66C 23/72
See application file for complete search history.

(56) References Cited

U.S. PATENT DOCUMENTS 3,240,353 A 3/1966 Leavesley
3,381,826 A * 5/1968 Durand .................... B66C 9/14
212/198

(Continued)

FOREIGN PATENT DOCUMENTS

CN 202016814 U 10/2011
FR 1323411 A 4/1963

(Continued)

*Primary Examiner* — Michael R Mansen
*Assistant Examiner* — Juan J Campos, Jr.
(74) *Attorney, Agent, or Firm* — Dilworth & Barrese, LLP

(57) ABSTRACT

The present invention relates to a crane (1) comprising a mast (2), an elongated boom (3) connected to the mast having a front portion (6) extending on one side of the mast and a rear portion (8) extending on the opposite side of the mast, and the boom (3) is linearly movable relative to the mast such that the length of the front portion and the length of the rear portion is adjustable by moving the boom relative to mast, and a counterweight (12) movably connected to the boom (3). The boom (3) and the counterweight (12) are arranged so that they can be moved independent of each other, and the counterweight and the boom are arranged so that the counterweight can pass the mast and be moved between the front portion (6) and the rear portion (8) independent of the position of the boom (3) with respect to the mast (2).

15 Claims, 3 Drawing Sheets

(56) References Cited

U.S. PATENT DOCUMENTS

| | | | | |
|---|---|---|---|---|
| 3,642,148 | A | * | 2/1972 | Durand .................. B66C 23/72 |
| | | | | 212/278 |
| 3,750,895 | A | * | 8/1973 | Durand .................... B66C 9/14 |
| | | | | 212/198 |
| 4,067,446 | A | * | 1/1978 | Ray ........................ B66C 23/84 |
| | | | | 212/253 |
| 4,113,112 | A | | 9/1978 | Ray |
| 5,609,260 | A | * | 3/1997 | Liao ....................... B66C 23/26 |
| | | | | 212/279 |
| 9,266,701 | B2 | | 2/2016 | Bosco et al. |

FOREIGN PATENT DOCUMENTS

| | | |
|---|---|---|
| JP | H07-113333 A | 5/1995 |
| SE | 415017 B | 1/1980 |

* cited by examiner

CRANE COMPRISING A MOVABLE BOOM AND A MOVABLE COUNTERWEIGHT

TECHNICAL FIELD

The present disclosure relates to a crane comprising a movable boom and a movable counterweight. The present disclosure also relates to the use of the crane for lifting components to a wind turbine.

BACKGROUND

Cranes are used in many different fields, mainly when building, repairing and carrying out maintenance of structures. Cranes are commonly employed in the transport industry for the loading and unloading of freight, in the construction industry for the movement of materials, and in the manufacturing industry for the assembling of heavy equipment.

Cranes are also used during maintenance of wind turbines. Wind turbines require regular maintenance of its main components, such as turbine blades, nacelles, gear boxes and generators. The weight of these components may vary depending on the size and type of the wind turbine. For example, the gear boxes may weigh between 20-45 tons, the generators and turbine blades may weigh between 15-30 tons. The components also vary considerably in size and shape. The cranes must be able to lift the components of varying size between the ground and the top of the wind turbine during the maintenance of the wind turbine. Due to the difference in weight, shape and size it can be difficult to lift the components with one and the same crane.

U.S. Pat. No. 9,266,701 B2 discloses a crane for lifting components to a wind turbine. The crane includes a telescoping mast upon which a crane base resides. A boom projects upwardly from the crane base and a jib typically projects upwardly from the boom. To provide stability to the crane during lifting and during vertical movement of the crane, a counterweight is mounted on the crane base. The boom can be pivoted relative the crane base to move an outer end of the jib in a horizontal direction. A disadvantage with this crane is that it is complicated and expensive to manufacture.

FR1323411 discloses a crane comprising a mast carrying at its upper end a guide for a movable boom. The boom has a front part extending on one side of the mast and a rear portion extending on the opposite side of the mast. The boom is horizontally movable relative to the mast such that the length of the front portion and the length of the rear portion is adjustable by moving the boom relative to mast. The crane comprise a hook connected to the front portion of the boom and a counterweight mounted on the rear portion of the boom. This crane makes it possible to adjust the length of the front part of the boom, and by that makes it possible to reach objects at different distances from the mast without having to move the crane. The counterweight is movable along a part of the rear portion of the boom. The counterweight and the boom are simultaneously movable in opposite direction relative the mast. The movement of the boom relative the mast is obtained by means of two cables having one end connected to the boom and their other ends attached to a cylindrical drum, and the movement of the counterweight is obtained by means of two other cables connected to the counterweight and having their opposite ends attached to another cylindrical drum. The drums are arranged on the same shaft which is driven by a motor. The cables are wound on their respective drums so that the counterweight and the boom are moved in the opposite directions when the motor is running. The crane is balanced by moving the counterweight in dependence on the movement of the boom relative the mast.

Due to the high usability of cranes, there is always a need for improving cranes.

SUMMARY

It is an aim of the present disclosure to provide an improved crane.

This aim is achieved by a crane as defined herein.

The crane comprises a mast, an elongated boom connected to the mast having a front portion extending on one side of the mast and a rear portion extending on the opposite side of the mast, and the boom is linearly movable relative to the mast such that the length of the front portion and the length of the rear portion is adjustable by moving the boom relative to mast, and a counterweight movably connected to the boom. The boom and the counterweight are arranged so that they can be moved independent of each other, and the counterweight and the boom are arranged so that the counterweight can pass the mast and be moved between the front portion and the rear portion independent of the position of the boom with respect to the mast. The crane comprises a first transmission system for moving the counterweight along the boom and a second transmission system for moving the boom relative to the mast, and the first and second transmission systems are arranged to independently move the counterweight and the boom.

According to the invention it possible to locate the counterweight on both sides of the mast independent of the position of the boom with respect to the mast. Thus, it possible to locate the counterweight on opposite sides of the mast for each possible position of the boom with respect to the mast. This is advantageous since it increases the possibility to balance the crane depending on the load on the crane, i.e. the weight carried by the hoisting arrangement, and the position of the boom with respect to the mast. This crane can lift heavy component as well as light weight components and components of different size and shape. For example, if a component is to be lifted at a short distance from the mast, the boom is moved such that the length of the front portion becomes shorter than the length of the rear portion. Thus, the weight of the rear portion of the boom will be heavier than the weight of the front portion. If the weight of the component is light, the total weigh of the component and the front portion can be less than the weight of the rear portion, which makes the crane unbalanced. An unbalanced crane will cause strain on the mast. Due to the fact that the counterweight is arranged movable to a position located on the front portion of the boom, it is possible to balance the crane in this case. On the other hand, if the component is heavy and the total weigh of the component and the front portion is larger than the weight of the rear portion, the counterweight can be moved to the rear portion in order to balance the crane. Accordingly, the crane can be balanced when lifting heavy as well as light weight components.

This is particularly important when the crane is being moved upwards or downward along a structure, such as a building or a wind turbine, since an unbalanced crane will cause wear on the drive mechanism for moving the crane. The cane is unloaded when it is moved to and from its working position close to the top of the structure. When the crane is unloaded, it is advantageous to have the counterweight on the front portion of the boom to balance the crane.

A further advantage with the invention is that it reduces the need of moving the boom to achieve balance of the crane when the crane is unloaded, or the crane carries a lightweight component. It is better to move the counterweight than to move the boom. Since the counterweight is attached to the boom, moving the boom relative the mast means that the boom with the counterweight is moved. Further, the weight of the boom is usually larger than the weight of the counterweight. Thus, moving the boom relative the mast requires more force and power than moving the counterweight relative to the boom.

According to some aspects, the counterweight is arranged linearly movable a first distance with respect to the boom, the boom is arranged linearly movable a second distance with respect to the mast, and the first distance is at least 30% longer than the second distance, preferably the first distance is at least 50% longer than the second distance, and most preferably the first distance is at least twice the second distance. Thus, the counterweight is movable a longer distance with respect to the boom than the boom is movable with respect to the mast. This makes it possible to move the counterweight instead of moving the boom to achieve balance of the boom with respect to the mast. The length of the front portion can be adjusted in dependence on the distance to the component to be lifted by the crane, while the counterweight is used to balance the crane.

The counterweight is arranged movable between two extreme positions, and the first distance is the distance between the two extreme positions. The boom is arranged linearly movable relative the mast along a part of the boom, and the second distance is the length of the part of the boom. The two extreme positions are located on opposite sides of the part of the boom and spaced apart from the part of the boom.

According to some aspects, the counterweight is arranged movable along at least 50% of the length of the boom, preferably the counterweight is arranged movable along at least 60% of the length of the boom. Most preferably the counterweight is arranged movable along at least 70% of the length of the boom. With the length of the boom is meant the distance between the outer end of the rear portion and the outer end of the front portion. Thus, the possibilities to balance the crane using the counterweight is improved.

According to some aspects, the mast comprises a fixed part and rotational part arranged rotatable relative the fixed part about an axis of rotation, the boom is movably connected to the rotational part, and the counterweight is arranged movable to a position on the front portion located at least 1 m from said axis of rotation. Preferably, the counterweight is arranged movable to a position on the front portion located a distance of at least 2 m from said axis of rotation. Most preferably, the counterweight is arranged movable to a position on the front portion located a distance of at least 3 m from said axis of rotation. Increasing the distance the counterweight can be moved in front of the mast, increase the possibilities to balance the crane using the counterweight when the crane carries components of low weight and when the crane is unloaded, without the need of moving the boom with respect to the mast to achieve balance of the crane.

According to some aspects, the crane comprises a hoisting arrangement connected to the front portion of the boom. The front portion of the boom is provided with a hoisting arrangement. However, the rear portion may also be provided with a hoisting arrangement.

According to some aspects, the counterweight is arranged movable to an outer end of the rear portion. Thus, it is possible to move the counterweight along the entire length of the rear portion of the boom. This enables the crane to lift heavy components, such as components to large wind turbines.

According to some aspects, the counterweight is disposed inside the boom, and the counterweight is arranged movable inside the boom. In one aspect, the boom comprises a framework defining an elongated interior space extending along the length of the boom and the counterweight is arranged movable inside said interior space. Thus, the counterweight is protected by the framework of the boom. This is, for example, advantageous during transportation of the crane to the site where it is to be used, such as a wind turbine park. The counterweight is protected by the framework. Further, it becomes easy to move the counterweight between the front and rear portions of the boom.

According to some aspects, the crane comprises a first transmission system for moving the counterweight along the boom, wherein the first transmission system comprises an elongated first gear rack attached to the boom and extending in the longitudinal direction of the boom, and a first gear wheel attached to the counterweight and arranged to engage with the first gear rack, and a first motor for driving the first gear wheel so that the first gear wheel is moving along the first gear rack. The length of the gear rack defined the distance the counterweight can be moved with respect to the boom. This transmission system is simple and reliable. Further, the transmission system allows the counterweight to be moved independent of the movement of the boom.

According to some aspects, the crane comprises a second transmission system for moving the boom relative to the mast, wherein the second transmission system comprises an elongated second gear rack attached to the boom and extending in the longitudinal direction of the boom, and a second gear wheel attached to the rotational part of the mast and arranged to engage with the second gear rack, and a second motor for driving the second gear wheel so that the second gear wheel is moving along the second gear rack. This transmission system is simple and reliable. Further, the transmission system allows the boom to be moved independent of the movement of the counterweight.

The invention further relates to the use of the crane according to the invention for lifting components to a wind turbine. The crane according to the invention is particularly suitable for lifting components to a wind turbine during building of the wind turbine and maintenance of the wind turbine since it enables lifting of heavy as well as light component. Further, the crane can be vertically moved, between the ground and the top of the wind turbine, in an unloaded state. In this case, the counterweight is moved to a position in front of the mast to balance the unloaded crane.

BRIEF DESCRIPTION OF THE DRAWINGS

The invention will now be explained more closely by the description of different embodiments of the disclosure and with reference to the appended figures.

DETAILED DESCRIPTION

Figure 1:
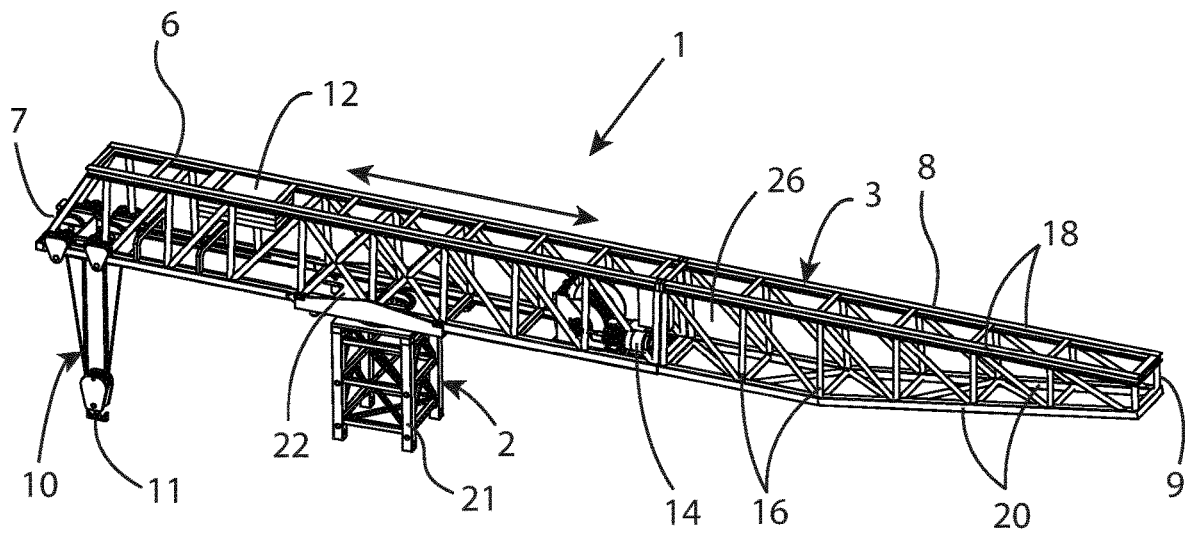
FIG. 1 shows a perspective view of an example of a crane including a movable boom and a movable counterweight according to the invention with the mast partially shown.

Aspects of the present disclosure will be described more fully hereinafter with reference to the accompanying drawings. The crane herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs.

Figure 2:
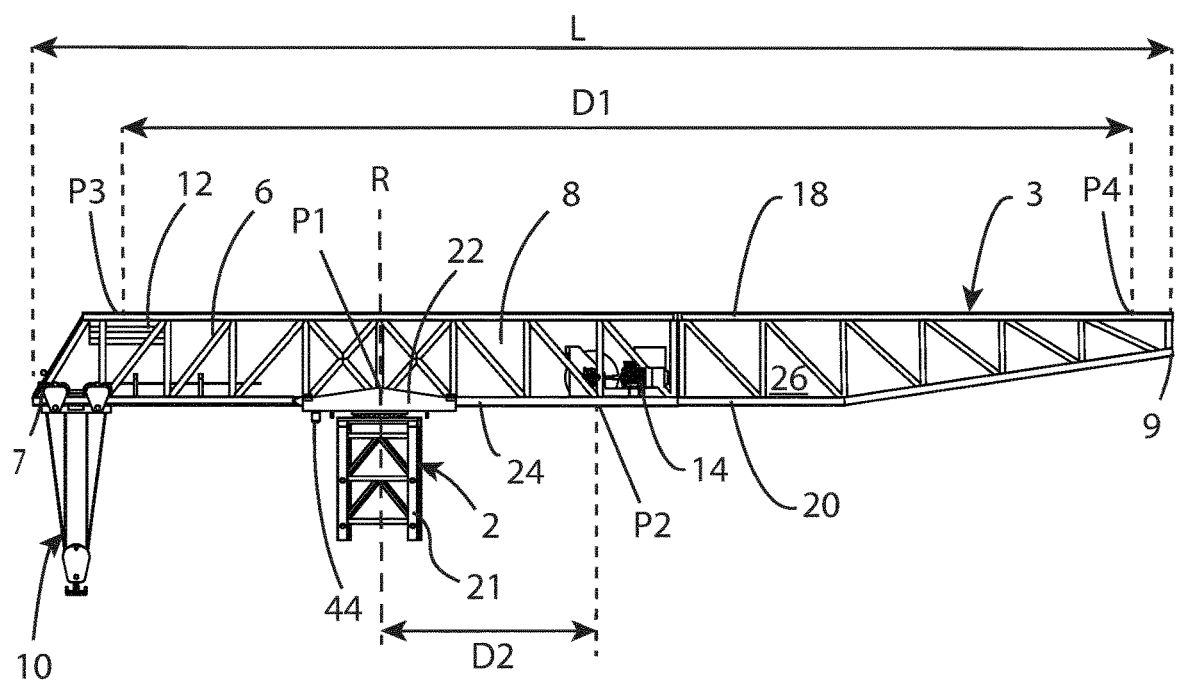
FIGS. 2-5 show side views of the crane shown in FIG. 1 with the boom and the counterweight in different positions.

FIG. 1 shows a perspective view of an example of a crane 1 comprising a movable boom 3 and a movable counterweight 12. FIG. 2 show a side view of the crane 1 shown in FIG. 1. The crane 1 comprises an elongated mast 2 and an elongated boom 3 movably connected to the mast 2. The figures show only the upper part of the mast. The boom 3 has a front portion 6 extending on one side of the mast 2 and a rear portion 8 extending on the opposite side of the mast 2. The boom 3 is arranged with its longitudinal axis perpendicular to the longitudinal axis of the mast. When the crane is in use, the mast 2 is vertically arranged and the boom 3 is horizontally arranged. The boom 3 is arranged linearly movable relative the mast 2. Thus, the length of the front portion 6 and the length of the rear portion 8 are adjustable by moving the boom 3 relative to mast 2. The total length L of the boom 3 is defined as the length between an outer end 7 of the front portion 6 and an outer end 9 of the rear portion 8, as shown in FIG. 2.

The crane 1 further comprises a hoisting arrangement 10 for lifting components. The hoisting arrangement 10 is connected to the front portion 6 of the boom. In one aspect, the hoisting arrangement 10 is arranged at the outer end 7 of the front portion. In this example, the hoisting arrangement 10 comprises a lifting device 11, such as a hook, for holding the component to be lifted and wires connected to the lifting device 11 for moving the lifting device with respect to the boom 3. The crane comprises a drive unit 14 for actuating the movements of the lifting device 11. The wires are connected between the lifting device 11 and the drive unit 14.

The mast 2 comprises a lower fixed part 21 and an upper rotational part 22 arranged rotatable relative the fixed part 21 about an axis of rotation R, as shown in FIG. 2. The boom 3 is movably connected to the rotational part 22. Thus, the boom 3 linearly movable with respect to the rotational part 22 and rotatable with respect to the fixed part 21 of the mast 2. Preferably, the counterweight 12 is arranged movable to a position on the front portion 6 located at least 1 m from the axis of rotation R. The position of the counterweight 12 is defined as the position of the center of gravity of the counterweight. More preferably, the counterweight 12 is arranged movable a distance of at least 2 m from said axis of rotation R, and most preferably a distance of at least 3 m from said axis of rotation R.**

In one aspect, the boom 3 and the mast 2 are arranged so that the linear movement of the boom 3 relative the mast 2 is restricted to a part 24 of the boom, as shown in FIG. 2. The movement of the boom 3 relative the mast 2 can be restricted to less than 50% of the length L of the boom. In this example, the movement of the boom 3 relative the mast 2 is restricted to about 20% of the length L of the boom.

One end of the part 24 is defined by a first position P1 and the other end is defined by a second position P2, which correspond to the extreme positions of the axis of rotation R along the boom. In this application, the first and second positions P1, P2 are defined as the intersectional points between the horizontal plane and the axis of rotation R of the rotational part 22 when the boom 3 is its extreme positions. The length of the movement of the boom with respect to the mast is restricted to the distance D2 between the first and second positions P1 and P2, i.e. to the distance between the two extreme positions of the axis of rotation R. The distance D2 corresponds to the length of the part 24.

The movement of the boom can be restricted in different ways. For example, the boom can be provided with one or two guiding members for guiding the movement of the boom, and the length of the guiding members corresponds to the length of the part 24. For example, the guiding member can be a track, a rail or a gear rack. The boom 3 can be made in one piece, or in two or more pieces which are attached to each other during use of the crane. If the boom is very long, it can be advantageous to divide the boom into two or more pieces, which are put together during usage of the boom. Thus, transportation of the boom is facilitated.

The crane 1 further comprises a counterweight 12 movably connected to the boom 3. The boom 3 and the counterweight 12 are arranged so that they can be moved independent of each other. The counterweight 12 and the boom 3 are further arranged so that the counterweight 12 can pass the by mast 2 and accordingly be moved between the front portion 6 and the rear portion 8 independent of the position of the boom 3 with respect to the mast 2. The counterweight 12 can thus be moved to an operative position on both sides of the mast 2. The movable counterweight 12 can thus be placed on each side of the mast to create equilibrium between the weight of the front portion 6 of the boom including the lifted load and the rear portion 8 of the boom. The counterweight 12 is arranged movable between a between a third position P3 located on the front portion 6 of the boom and a fourth position P4 located on the rear portion 8 of the boom. In this application, the third and fourth positions P3, P4 are defined as the positions of the center of gravity of the counterweight when the counterweight is its extreme positions.

The movable counterweight 12 can move along the boom 3 and be positioned at any point between the third position P3 and the fourth position P4. The third position P3 is located space apart from the first position P1 and the fourth position P3 is located spaced apart from the second position P2. The third position P3 is located closer to the outer end 7 of front portion 6 of the boom than the first position P1, and the fourth position P3 is located closer to the outer end 9 of the rear portion 8 of the boom than the second position P2. Thus, it is possible for the counterweight 12 to be moved between opposite sides of the mast 2.

The counterweight 12 is arranged movable along at least 50% of the length L of the boom 3. Preferably, the counterweight 12 is arranged movable along at least 70% of the length L of the boom. Most preferably the counterweight is arranged movable along at least 80% of the length L of the boom. Thus, the possibilities to balance the crane using the counterweight is improved. The distance the counterweight 12 is arranged movable along the boom is defined as the distance between the center of gravity of the counterweight in the two extreme positions. With the length L of the boom is meant the distance between the outer end 7 of the rear portion and the outer end 9 of the front portion. Thus, the possibilities to balance the crane using the counterweight is improved. In this example, the third position P3 is in close vicinity of the outer end 7 of the front portion 6 of the boom, and the fourth position P4 is in close vicinity of the outer end 9 of the rear portion 8. Thus, the counterweight 12 can be movable along most of the length of the boom 3.

The boom 3 comprises a framework 16 including a plurality of beams. In one aspect, the framework 16 comprises two upper beams 18 extending in parallel along an upper part of the boom. In one aspect, the framework 16 comprises two lower beams 20 extending in parallel along a lower part of the boom. The framework further comprises a plurality beams arranged between the beams 18 and 20 to form a lattice.

The framework 16 is arranged so that an elongated interior space 26 is formed inside the framework 16. In this example, the interior space 26 extends along the entire length of the boom 3. In one aspect, the counterweight 12 is arranged movable inside the interior space 26. Thus, the counterweight is protected by the framework 16, and it becomes easier to transport the boom including the counterweight to site and mounting of the boom to the mast is facilitated. Alternatively, the counterweight 12 can be arranged movable on top of the framework, or on one of the sides of the framework.

In this example, the interior space 26 inside the framework 16 has a rectangular cross-section. In one aspect, the counterweight is rectangular. Thus, the counterweight 12 is compact and has a defined center of gravity. Further, the rectangular counterweight fits well inside the rectangular interior space 26. The counterweight 12 is movably connected to the two upper beams 18 and is arranged movable along the two upper beams 18.

The counterweight 14 is arranged linearly movable a first distance D1 with respect to the boom 3, as shown in FIG. 2. The boom 3 is arranged linearly movable a second distance D2 with respect to the mast 2. The first distance D1 is the distance between the third and fourth positions P3, P4. The second distance D2 is the distance between the first and second positions P1, P2. The first distance D1 is longer than the second distance D2. Preferably, the first distance D1 is at least 30% longer than the second distance D2. More preferably, the first distance is at least 50% longer than the second distance, and most preferably the first distance D1 is at least twice the second distance D2. Thus, the counterweight is movable a longer distance with respect to the boom than the boom is movable with respect to the mast. The length of the front portion can be adjusted in dependence on the distance to the component to be lifted by the crane, while the counterweight is used to balance the crane.

The crane 1 comprises a first transmission system for moving the counterweight 12 along the boom 3 and a second transmission system for moving the boom 3 relative to the mast, and the first and second transmission systems are arranged to independently move the counterweight and the boom 3.

FIG. 2 show the crane 1 with the boom 3 in the first position P1 and the counterweight 12 in the third position P3. Thus, the counterweight 12 is in front of the mast, i.e. at the front portion 6 of the boom. This is, for example, suitable when the crane is unloaded and need to be moved to and from the top of a building or a wind turbine, or the crane is lifting light-weight components at a short distance from the crane.

Figure 3:
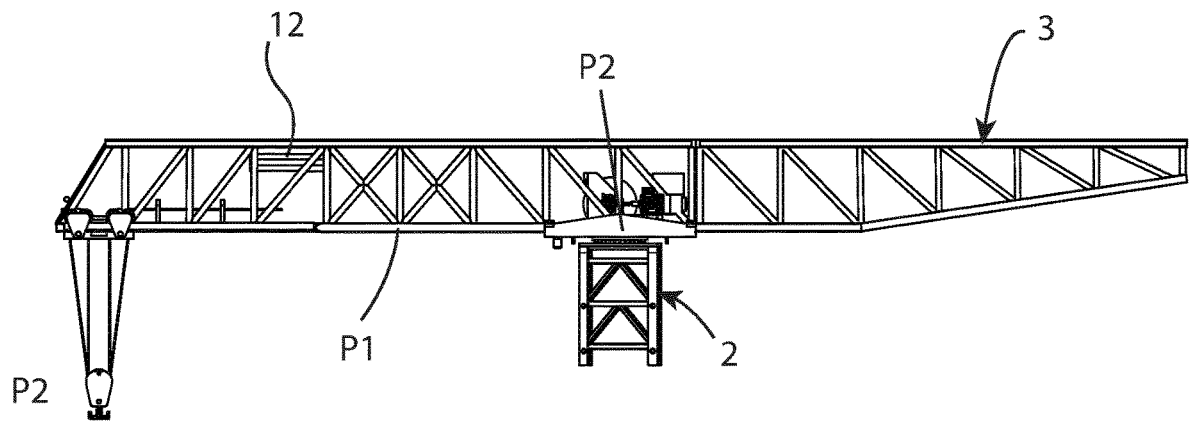

FIG. 3 show the crane 1 with the boom 3 in the second position P2 and the counterweight 12 still at the front portion 6 of the boom. This is, for example, suitable when the crane is unloaded and need to be moved to and from the top of a building or a wind turbine, or the crane is lifting light-weight components at a long distance from the crane.

Figure 4:
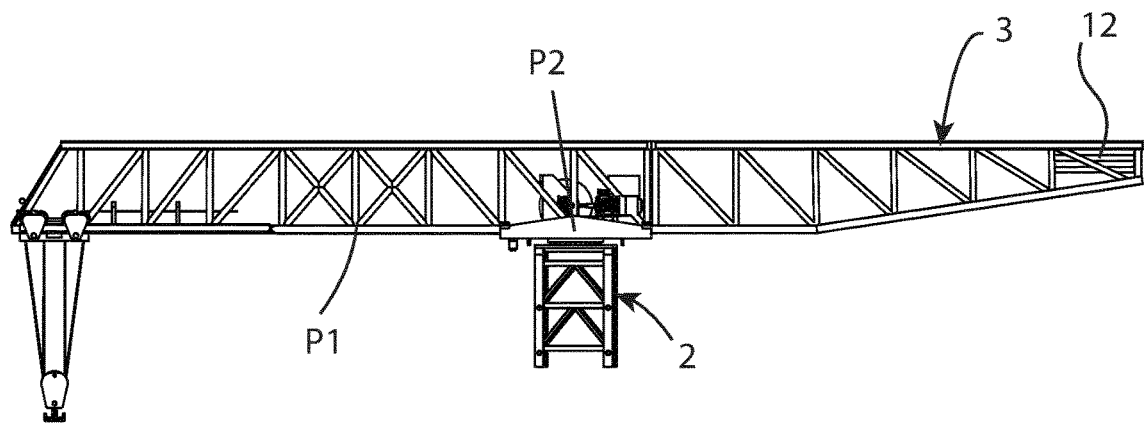

FIG. 4 show the crane 1 with the boom 3 in the second position P2, and the counterweight 12 in the fourth position at the rear portion 6 of the boom. This is suitable when the crane is lifting heavy components at a long distance from the crane.

Figure 5:
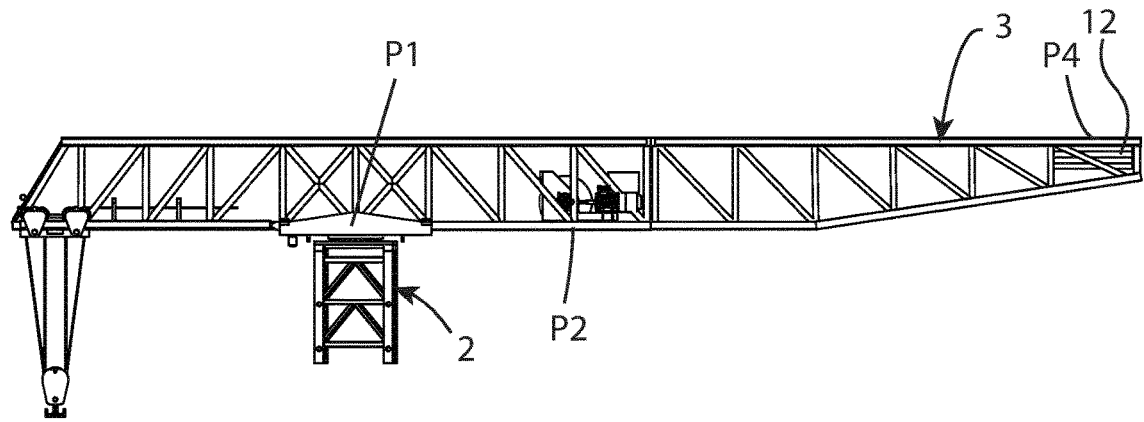

FIG. 5 show the crane 1 with the boom 3 in the first position P1, and the counterweight 12 in the fourth position at the rear portion 6 of the boom. This is suitable when the crane is lifting heavy components at a short distance from the crane.

Figure 6:
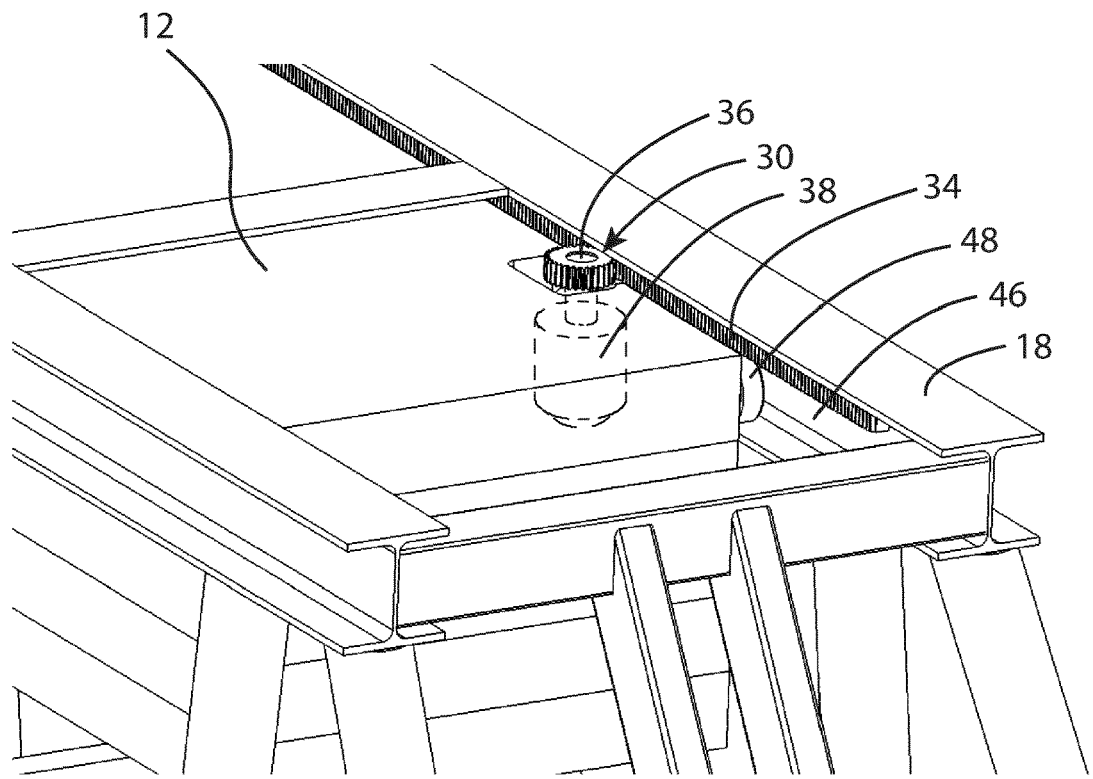
FIG. 6 shows in a larger scale an example of a transmission system for moving the counterweight with respect to the boom.

FIG. 6 shows in a larger scale an example of a first transmission system 30 for moving the counterweight 12 with respect to the boom 3. The first transmission system 30 comprises an elongated first gear rack 34 attached to the boom 3 and extending in the longitudinal direction of the boom 3, a first gear wheel 36 attached to the counterweight 12 and arranged to engage with the first gear rack 34, and a first motor 38 for driving the first gear wheel 36 so that the first gear wheel is moving along the first gear rack 34. Preferably, the first motor 38 is an electric motor. In this example, the first gear rack 34 is attached to one of the upper beams 18 of the boom. In one aspect, the first transmission system 30 may comprise two gear rack 34, and each of the gear racks 34 is attached to one of the upper beams 18. In such case, the first transmission system 30 comprises at least two first gear wheels 36 attached to the counterweight 12 and arranged to engage with the first gear racks, and at least two motors 38 for driving the first gear wheels 36.

In this example, the upper beam 18 is a H-beam. The upper beam 18 has an elongated groove 46 extending along the length of the beam. The counterweight 12 is provided with a wheel 48 arranged movable along the groove 46. The first motor 38 actuates the movement of the gear wheel 36 so that the gear wheel 36 is moved along the gear rack 34. The first motor 38 is configured to move the gear wheel 36 in two opposite directions along the gear rack. In this example, the length of the first gear rack 34 and the position of the first gear wheel 36 defines the distance D1.

Figure 7:
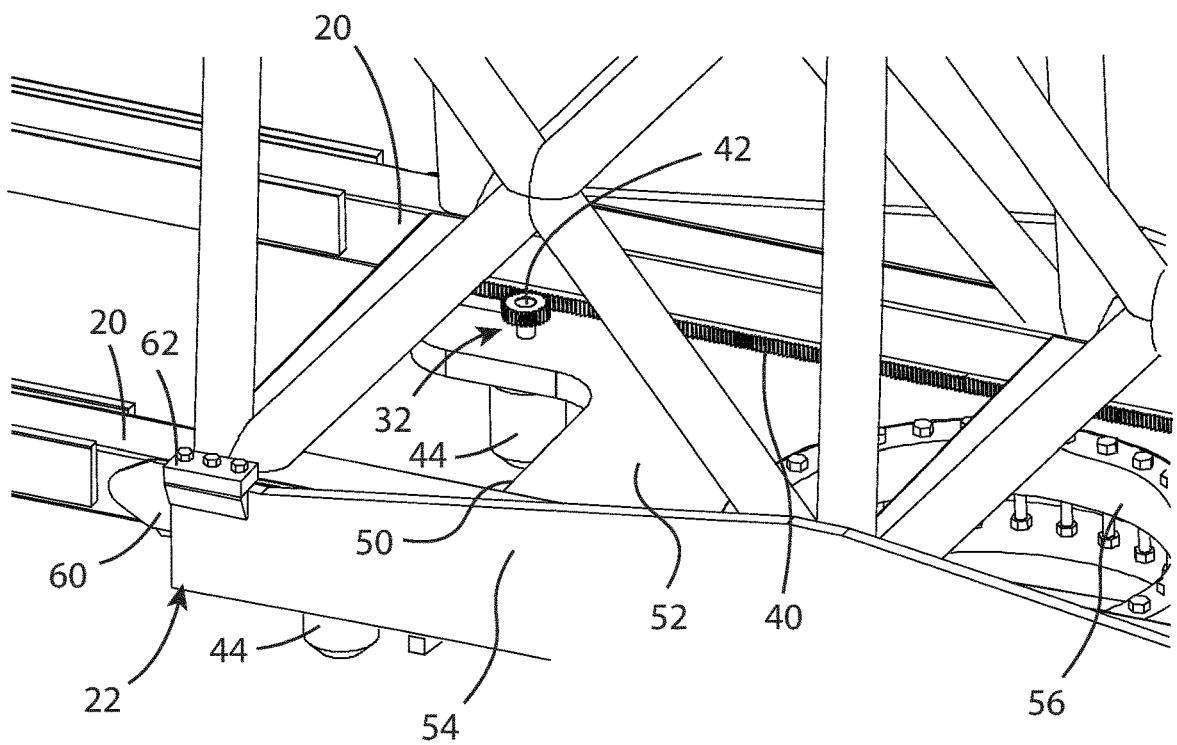
FIG. 7 shows in a larger scale an example of a transmission system for moving the boom with respect to the mast.

FIG. 7 shows in a larger scale an example of a second transmission system 32 for moving the boom 3 with respect to the mast 2. The second transmission system 32 comprises an elongated second gear rack 40 attached to the boom 3 and extending in the longitudinal direction of the boom, and a second gear wheel 42 attached to the rotational part 22 of the mast and arranged to engage with the second gear rack 40, and a second motor 44 for driving the second gear wheel 42 so that the second gear wheel is moving along the second gear rack 40. Preferably, the second motor 44 is an electric motor. In this example, the second gear rack 40 is attached to one of the lower beams 20 of the boom. In one aspect, the second transmission system 32 may comprise two gear racks 40, and each of the gear racks 40 is attached to one of the lower beams 20 of the boom. The second transmission system 30 may comprise two or more first gear wheels 42 attached to the counterweight 12 and arranged to engage with the second gear racks 40, and two or more motors 38 for driving the second gear wheels 42.

In this example, the rotational part 22 comprises a plate shaped body 50 having an upper surface 52 and two side walls 54 protruding from the body 50 on opposite sides of the boom. The lower beams 20 of the boom is sliding on the upper surface 52 of the rotational part 22. The side walls 54 guides the boom during the linear movement of the boom. The lower beams 20 of the boom are provided with sliding rails 60 facing the side walls 54 and extending along the part 24. The sliding rails 60 slide on inner surfaces of the walls 54. The side walls 54 are provided with stop elements 62 protruding inwards. The stop elements 62 keeps the boom in place on the upper surface 54 of the rotational part 22. The stop elements 62 rest on the lower beams 20. Thus, the lower beams 20 slide between the upper surface 54 of the rotational part 22, the side walls 54, and the stop elements 62.

The second motor 44 actuates the movement of the second gear wheel 42 so that the second gear wheel 42 is moved along the gear rack 34. Thus, the first motor 44 actuates the movement of the boom 3 with respect to the rotational part 22 of the mast. The second motor 44 is configured to move the second gear wheel 44 in two opposite directions along the second gear rack 40. In this example, the length of the second gear rack 44 and the position of the second gear wheel 42 defines the distance D2. The fixed part 21 of the mast comprises a slewing ring (not shown). The rotational part 22 comprises a ring-shaped element 56 provided with fastening means, such as bolts or screws, for attaching the rotational part 22 to the slewing ring of the fixed part of the mast.

REFERENCE LIST 1 crane
2 mast
3 boom
6 front portion of boom
7 outer end of front portion
8 rear portion of boom
9 outer end of rear portion
10 hoisting arrangement
11 lifting device
12 counterweight
14 drive unit for the lifting arrangement
16 framework
18 upper beams
20 lower beams
21 Fixed part of the mast
22 rotational part of the mast
24 part of the boom that is movable
26 space inside the boom
30 first transmission system
32 second transmission system
34 first gear rack
36 first gear wheel
38 first motor
40 second gear rack
42 second gear wheel
44 second motor
P1, P2 extreme positions of the boom
P3, P4 extreme positions of the counterweight
46 grooves
48 wheels
50 plate shaped body
52 upper surface of the body
54 side walls
56 clewing ring
60 sliding rail
62 stop elements

The invention claimed is:

1. A crane (1) comprising:
a mast (2),
an elongated boom (3) connected to the mast having a front portion (6) extending on one side of the mast and a rear portion (8) extending on the opposite side of the mast, and the boom (3) is linearly movable relative to the mast such that the length of the front portion and the length of the rear portion is adjustable by moving the boom relative to mast,
a counterweight (12) movably connected to the boom (3),
a first transmission system (30) for moving the counterweight (12) along the boom (3), and
a second transmission system (32) for moving the boom (3) relative to the mast, wherein
the first and second transmission systems (30, 32) are arranged to independently move the counterweight and the boom (3), and
the counterweight and the boom are arranged so that the counterweight can pass the mast and move between the front portion (6) and the rear portion (8) independent of the position of the boom (3) with respect to the mast (2).

2. The crane according to claim 1, wherein the counterweight (12) is arranged movable a first distance (D1) with respect to the boom (3), the boom (4) is arranged linearly movable a second distance (D2) with respect to the mast (2), and the first distance (D1) is at least 30% longer than the second distance (D2).

3. The crane according to claim 2, wherein the first distance (D1) is at least 50% longer than the second distance (D2).

4. The crane according to claim 3, wherein the first distance (D1) is at least twice the second distance (D2).

5. The crane according to claim 1, wherein the counterweight (12) is arranged movable along at least 50% of the length (L) of the boom (3).

6. The crane according to claim 5, wherein the counterweight (12) is arranged movable along at least 60% of the length (L) of the boom (3).

7. The crane according to claim 1, wherein the mast (2) comprises a fixed part (21) and rotational part (22) arranged rotatable relative the fixed part (21) about an axis of rotation (R), the boom (3) is movably connected to the rotational part (22), and the counterweight (12) is arranged movable to a position on the front portion (6) located at least 1 m from said axis of rotation (R).

8. The crane according to claim 7, wherein the counterweight (12) is arranged movable to a position on the front portion (6) located at least 2 m from said axis of rotation (R).

9. The crane according to claim 8, wherein the counterweight (12) is arranged movable to a position on the front portion (6) located at least 3 m from said axis of rotation (R).

10. The crane according to claim 1, wherein the counterweight (12) is arranged movable to an outer end (9) of the rear portion (8).

11. The crane according to claim 1, wherein the counterweight (12) is disposed inside the boom (3) and is arranged movable inside the boom (3).

12. The crane according to claim 1, wherein the boom (3) comprises a framework (16) defining an elongated interior space (26) and the counterweight (12) is arranged movable inside said interior space (26).

13. The crane according to claim 1, wherein the first transmission system (30) comprises:
an elongated first gear rack (34) attached to the boom (3) and extending in the longitudinal direction of the boom (3),
a first gear wheel (36) attached to the counterweight (12) and arranged to engage with the first gear rack (34), and a first motor (38) for driving the first gear wheel (36) so that the first gear wheel is moving along the first gear rack (34).

14. The crane according to claim 1, wherein the second transmission system (32) comprises an elongated second gear rack (40) attached to the boom (3) and extending in the longitudinal direction of the boom (3), and a second gear wheel (42) attached to the mast (2) and arranged to engage with the second gear rack (40), and a second motor (44) for driving the second gear wheel (42) so that the second gear wheel is moving along the second gear rack (40).

15. The crane according to claim 1, wherein the crane comprises a hoisting arrangement (10) connected to the front portion of the boom.

\* \* \* \* \*